UNITED STATES PATENT OFFICE.

ARMAND GARDOS, OF CLEVELAND, OHIO.

TREATED STOCKING.

1,219,451.　　Specification of Letters Patent.　　Patented Mar. 20, 1917.

No Drawing.　　Application filed October 4, 1915. Serial No. 54,031.

*To all whom it may concern:*

Be it known that I, ARMAND GARDOS, a subject of the King of Hungary, having declared my intention of becoming a citizen of the United States, residing at Cleveland, in the county of Cuyahoga and State of Ohio, have invented certain new and useful Improvements in Treated Stockings, of which the following is a specification.

My invention relates to the process of treating stockings to counteract sweating of the feet. With my invention the stockings are subjected to certain chemicals mixed in proper proportions and which are applied to the stocking in a certain manner during the process or treatment.

The method of applying the ingredients used prevents the chemical which counteracts the sweating from coming in direct contact with the flesh when the stockings are worn.

In counteracting the sweating of the feet the life of the stockings are naturally prolonged.

The process consists in applying chemicals to the stockings to prevent the superfluous separation of butyric acid from the sweat glands of the flesh with which they are in contact.

The process is as follows:

The stockings are first soaked for a few hours in a 500 gram 20% H.CHO (formaldehyde) solution, mixed with the same amount of $C_3H_5(OH)_3$ (glycerin), 2000 cc. $C_2H_5(OH)$ 96% (alcohol) and 3000 cc. $H_2O$ (water). The glycerin forms a body to prevent the rapid evaporation of the formaldehyde while the alcohol serves as a volatile solvent.

After taking them from the foregoing solution, the stockings are placed in a drier or oven subjected to a slight heat so that the H.CHO gases entirely penetrate the threads of the stockings.

After remaining for a few hours in the oven the stockings are removed and drizzled or sprayed with a one part waterless wool fat in 15 parts $(C_2H_5)_2O$ (ether) solution after which they are again dried. The ether serves to dilute the wool fat so it can be readily applied and also serves as a volatile solvent.

This latter treatment prevents the escape of the H.CHO gases in the threads or fabric of the stockings. The chemicals are not in direct contact with the flesh and act to retard the dissolution of the fatty portions and consequently do not develop great absorbing capacities. The formaldehyde is normally retained by the fatty solution but the heat from the flesh affects the fat and allows the formaldehyde to be released when the stockings are worn. The complete formaldehyde formula as used in the specification is 500 grams 20% H.CHO.

Having thus described my invention, what I desire to secure by Letters Patent is:

1. A stocking having the fabric impregnated with a solution to counteract the butyric acid separated by the sweat glands and treated with a solution to prevent the escape of the first solution.

2. A stocking having the fabric subjected to a gaseous ingredient acting as a preservative and disinfectant and then treated with a fatty substance to prevent the escape of the gaseous ingredients.

3. A stocking having the fabric impregnated with formaldehyde and a fatty substance to prevent the escape of the formaldehyde from the fabric.

4. A stocking having the fabric impregnated with formaldehyde and treated with a wool fat substance to prevent the escape of the formaldehyde from the fabric.

5. A stocking having the fabric impregnated with a solution to counteract the butyric acid separated by the sweat glands and treated with a wool fat solution to prevent the escape of the first solution.

In testimony whereof I affix my signature in the presence of two witnesses.

ARMAND GARDOS.

Witnesses:
　ROSE GARDOS,
　S. C. MIKLISIN.